United States Patent [19]
Lindenmuth

[11] Patent Number: 5,774,992
[45] Date of Patent: Jul. 7, 1998

[54] DUST SHROUD FOR POWER SAW

[76] Inventor: Steve D. Lindenmuth, 4364 Jessica Cir., Fremont, Calif. 94555

[21] Appl. No.: 806,214

[22] Filed: Feb. 26, 1997

[51] Int. Cl.$^6$ .................................................. B25F 3/00
[52] U.S. Cl. ...................................... 30/124; 451/456
[58] Field of Search ................. 30/124, 390; 144/252.1; 451/453, 456

[56] References Cited

U.S. PATENT DOCUMENTS

| | | | |
|---|---|---|---|
| 3,401,724 | 9/1968 | Kreitz | 451/456 |
| 4,022,182 | 5/1977 | Lenkevich | 30/390 |
| 4,090,297 | 5/1978 | Wanner et al. | 30/124 |
| 4,192,104 | 3/1980 | Patenauda | 144/252.1 |
| 4,241,505 | 12/1980 | Bodycomb, Jr. et al. | 30/390 |
| 4,296,572 | 10/1981 | Quintana | 451/456 |
| 4,409,699 | 10/1983 | Moorhouse | 451/456 |
| 5,084,972 | 2/1992 | Waugh | 30/124 |
| 5,167,215 | 12/1992 | Harding, Jr. | 30/124 |
| 5,327,649 | 7/1994 | Skinner | 30/124 |
| 5,445,056 | 8/1995 | Folci | 30/124 |
| 5,479,709 | 1/1996 | Lai | 30/123.3 |

Primary Examiner—Hwei-Siu Payer
Attorney, Agent, or Firm—Terrance L. Siemens

[57] ABSTRACT

A dust collecting shroud for removably attaching to a circular saw. The shroud is horizontally oriented relative to the blade of the circular saw in a position parallel to and below the base of the circular saw. The shroud has upper and lower panels enclosing and defining a dust collection chamber. The upper and lower panels have overlying slots for passing the blade and blade guard through the shroud. A short conduit stub communicating with the dust collection chamber is provided for accepting connection of a vacuum hose, which hose is not part of the invention, for evacuation of cuttings from the chamber. A removable panel has a slot of variable width, for cooperating very closely with the blade and the blade guard. This removable panel is reversibly inserted into the shroud, so that the circular saw may be reversibly mounted to the shroud. Threaded studs project upwardly from the shroud, so that they penetrate holes drilled into commercially available electrically powered circular saws. The shroud is fastened to the circular saw by tightening nuts onto the studs with the circular saw in position on the shroud.

7 Claims, 2 Drawing Sheets

DUST SHROUD FOR POWER SAW

BACKGROUND OF THE INVENTION

1. Field of the Invention

The present invention relates to collection of dust or cuttings from a powered saw. More particularly, the invention comprises a shroud which is removably installed over a powered, hand wielded circular saw. The shroud has short tubes enabling connection to vacuum hoses.

2. Description of the Prior Art

When cutting tools such as circular saws are used, they generate dust and cuttings which may interfere with the task at hand. This problem is especially pronounced when cutting is constantly being performed rather than only occasionally. Dust may be removed by blowing or suction. Blowing is likely to disperse dust and cuttings so as to foul new work and fresh materials, to get into the eyes, nose, and mouth of the craftsman, to clog equipment, and foul the workplace.

Gathering dust and cuttings by suction is greatly preferred, and the prior art has suggested numerous apparatuses for gather dust. Dust collection shrouds shown in U.S. Pat. Nos. 4,022,182, issued to Steve T. Lenkevich on May 10, 1977, 4,241,505, issued to Frederick M. Bodycomb, Jr., et al. on Dec. 30, 1980, 5,084,972, issued to Ricky L. Waugh on Feb. 4, 1992, 5,167,215, issued to Edward M. Harding, Jr. on Dec. 1, 1992, and 5,327,649, issued to Christopher L. Skinner on Jul. 12, 1994, relate to circular saws.

In each one of these prior art inventions, the shroud is vertically oriented, and generally envelopes the circular blade. This orientation and cooperation require close cooperation with the housing of the circular saw. By contrast, the shroud of the present invention is generally horizontally oriented. It comprises an upper and lower panel each having a slot for passing the blade entirely through the shroud. This arrangement enables the novel shroud to be universally compatible with many commercially available models of powered circular saws without requiring close cooperation with the housing of each circular saw.

None of the above inventions and patents, taken either singly or in combination, is seen to describe the instant invention as claimed.

SUMMARY OF THE INVENTION

The present invention comprises a shroud which envelops the flat base of a hand wielded circular saw rather than enveloping the circular blade. Upper and lower shroud panels are fastened together after the base of the saw is placed over the lower panel. The panels are sufficiently great in area to essentially duplicate the function of the flat base of the circular saw.

Each panel has a slot enabling the blade and the blade guard to pass entirely through the shroud. The upper and lower panels are joined and sealed at their perimeter, so that when suction is applied, make-up air flows into the chamber formed between the upper and lower panels through the slots enabling passage of blade and blade guard.

The novel shroud has two fluid conduit stubs communicating with the interior chamber. These stubs enable connection of a vacuum hose, so that vacuum is connected for evacuating cuttings.

A separate panel having a slot narrowed at one end, for accommodating passage of only the blade, and relatively widened at the other end, for passage of the blade guard, is configured to be reversibly placed within the novel shroud.

The separate panel enables the upper slot to cooperate closely with the blade and blade guard, minimizing clearances between the shroud and the circular saw. Minimizing clearances restricts air flow into the chamber through the upper slot and assists in maintaining evacuation of cuttings by vacuum. The separate panel enables both forward and backward operation, so that the vacuum hose connection stubs may be located selectively at the right or left of the circular saw.

The upper panel of the shroud is connected to the lower panel by studs permanently mounted in the lower panel. The studs pass through holes formed in the upper panel, and secured by nuts. The studs pass through holes which are drilled into the base of the circular saw. Identical hole patterns may be formed throughout many commercially produced circular saws, with the studs located to coincide with the standard hole pattern. The shroud is thus transferrable among many circular saws. No further modification to the circular saw is required for securing the novel shroud thereto.

Accordingly, it is a principal object of the invention to provide a dust collection shroud for a hand wielded power circular saw.

It is another object of the invention to cooperate with circular saws of different models and manufacturers.

It is a further object of the invention to orient a dust collecting chamber perpendicularly to the circular saw blade.

Still another object of the invention is to enable both the circular saw blade and the blade guard to pass through the novel shroud.

An additional object of the invention is to minimize gaps or clearances between the circular saw and the novel shroud.

It is again an object of the invention to provide at least one conduit stub for connection of a vacuum hose.

Yet another object of the invention is to enable adjustment of the novel shroud so that the vacuum hose may be located selectively at the right and at the left of the saw blade.

Still another object of the invention is to mount the novel shroud to a circular saw by partially surrounding the base of the circular saw.

Another object of the invention is to secure the shroud to the circular saw while utilizing existing structure of the circular saw, and avoiding modification to the circular saw.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
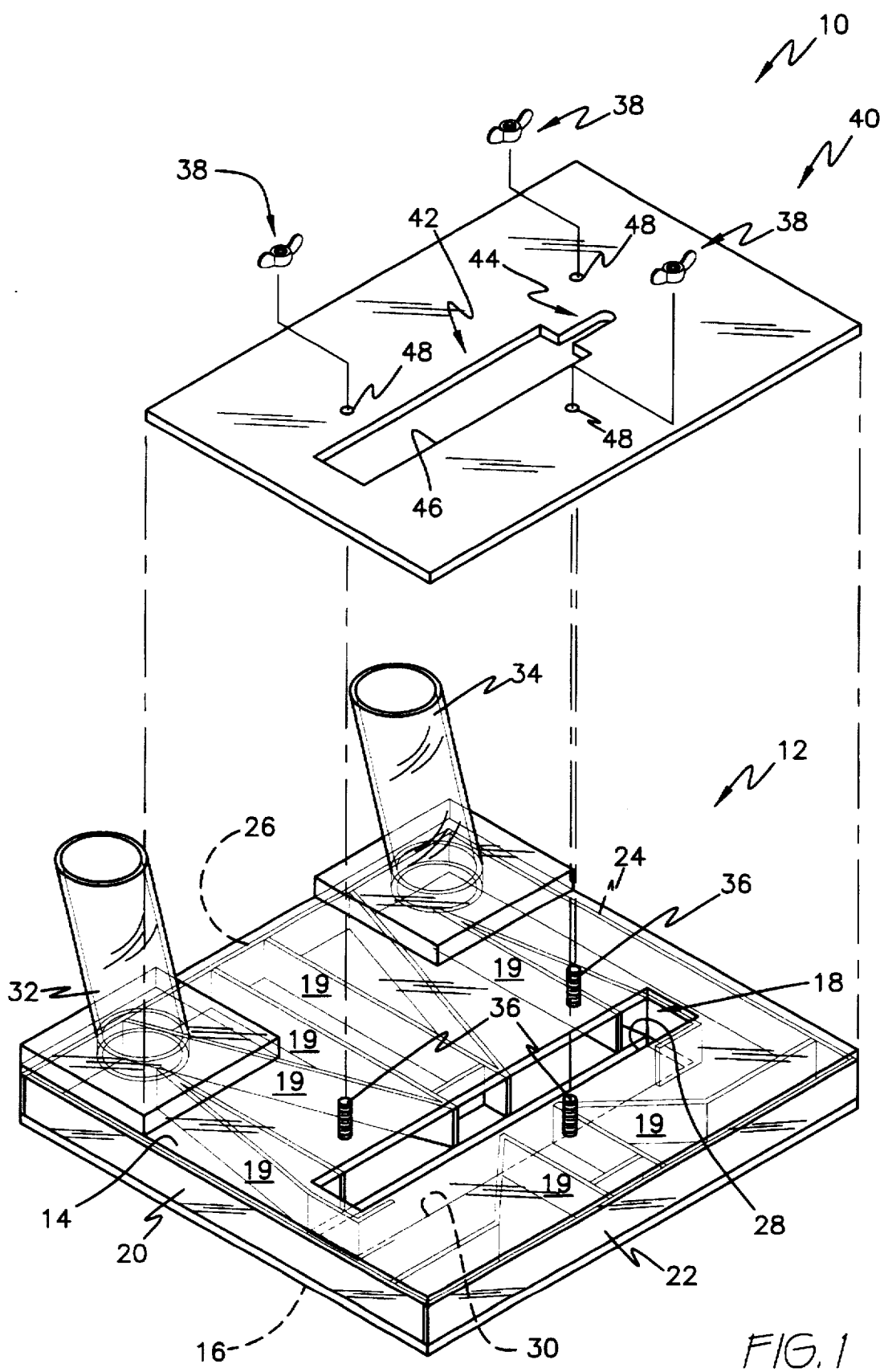
FIG. 1 is a perspective, partially exploded view of the invention.

Novel shroud 10 is seen in FIG. 1 to comprise two principal separate components. A body 12 has an upper panel 14 and a lower panel 16 disposed beneath upper panel 14. Open chambers 18 are defined between panels 14 and 16. Panels 14 and 16 are joined to one another and sealed by lateral walls 20, 22, 24, 26. Upper panel 14 has an elongated slot 28 formed therein, and lower panel 16 has a corresponding elongated slot 30 disposed in vertical registry with and below slot 28. Slots 28 and 30 are disposed in overlying relationship.

Two short conduit stubs 32, 34 project upwardly from upper panel 14. Stubs 32, 34 are open to and communicate with chambers 18. Stubs 32, 34 enable hoses (one hose 7 is illustratively shown in FIG. 3) of vacuum devices (not shown) to be connected to shroud 10 by slipping over one or both stubs 32, 34, for purposes of evacuating dust and cuttings (not shown). If only one stub 32 or 34 is connected to a vacuum hose, a cap 35 (see FIG. 3) may be placed over the idle remaining stub 34 or 32. Chambers 18 are open to the atmosphere only at the openings of stubs 32, 34 and at slots 28, 30. In the depiction of FIG. 1, each chamber 18 has vertical walls 19 separating one chamber 18 from the other chamber 18.

It will be appreciated that each chamber 18 provides a passageway conducting dust and cuttings from the point of contact of blade 4 (see FIG. 3) with the workpiece W (see FIG. 3) to a stub 32 or 34. Obviously, chambers 18 may communicate with one another, thereby forming a single chamber (not shown), if desired. A single chamber, if provided, could open to blade 4 along a single continuous opening rather than along the two openings of the two chambers 18 as depicted.

Threaded studs 36 project upwardly from upper panel 14. Studs 36 will subsequently receive wingnuts 38 (only two shown) during assembly of shroud 10 to a circular saw 2 (see FIG. 2).

The second principal component of shroud 10 is an adapting member 40. Adapting member 40 has a third slot 42 having a relatively narrow section 44 and a relatively wide section 46. A hole 48 is provided for each stud 36 of body 12, and is located in vertical registry therewith when adapting member 40 is placed over body 12. The number and location of holes 48 are sufficient to assure that there is a hole 48 for each stud 36 for each of two possible positions of adapting member 40 relative to body 12.

One position is that depicted in FIG. 1, wherein adapting member 40 is lowered onto body 12. In the second position, adapting member 40 may be rotated one hundred eighty degrees about a vertical axis (not shown), so that narrow section 44 of slot 42 points to the left.

Figure 3:
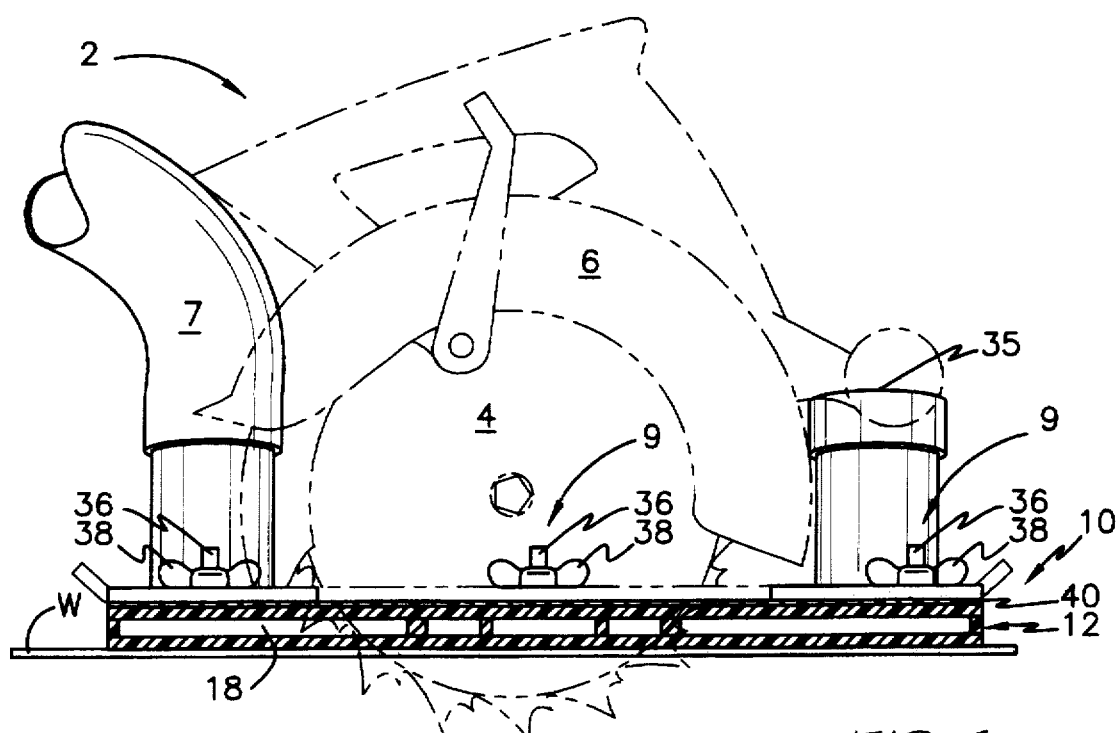
FIG. 3 is an environmental, side elevational view of the invention.
Figure 2:
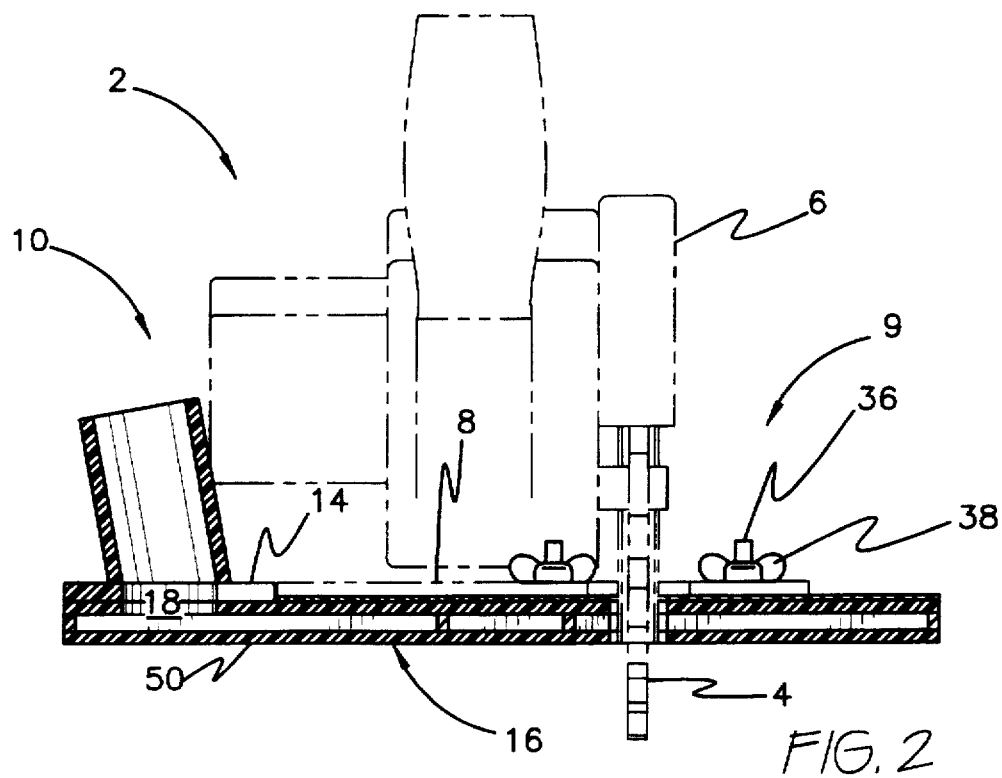
FIG. 2 is an environmental, front end elevational view of the invention.

Turning now to FIGS. 2 and 3, shroud 10 is shown in its mounted in an operable position on a hand wielded, powered circular saw 2 of well known nature. Saw 2 has a circular, rotatable blade 4, a blade guard 6, and a flat base 8 for sliding saw 2 along and above a workpiece W (see FIG. 3). Adapting member 40 is placed immediately above body 12, with narrow slot section 44 located appropriately for the intended direction or position of saw 2. When mounted to shroud 10, saw 2 is placed on adapting member 40 and aligned with studs 36 such that studs 36 pass through holes 9 formed in base 8 of saw 2. Blade 4 and guard 6 of saw 2 pass through slots 28 and 30 of body 12. Blade 4 passes through narrow slot section 44 of adapting member 40. Wingnuts 38 are then tightened onto the exposed portions of studs 36 to secure saw 2 to shroud 10.

Adapting member reduces clearances between circular blade 4 of saw 2 and upper panel 14 of body 12, and also reduces clearances between guard 6 of saw 2 and lower panel 16 of body 12 of shroud 10. Adapting member 40 is dimensioned and configured to abut flush against upper panel 14 of said body and having formed therein a third slot including a relatively narrow section 44 for passing only the blade of the circular saw therethrough and a relatively wide section 46 for passing the blade guard therethrough.

The arrangement of studs 36 and holes 9 and 48 assures that body 12 is horizontally oriented when blade 4 is vertically oriented. Saw 2 and shroud 10 may be wielded in conventional manner as a united assembly, with the bottom surface 50 of lower panel 16 of body 12 slidably supporting saw 2 and shroud 10 on workpiece W. Surface 50 is flat, planar, and horizontal when shroud 10 is mounted or assembled to saw 2. This enables saw 2 to be slid on workpiece W in conventional manner, wherein saw 2 cuts in its conventional position relative to workpiece W when shroud 10 is mounted to saw 2.

Preferably, body 12 is fabricated from a transparent material, so that a person cutting workpiece W with shroud 10 mounted to saw 2 may observe workpiece W while cutting the same, to assure that saw blade 4 is cutting along an intended path, and to monitor whether workpiece W has suffered incidental damage during cutting.

Shroud 10 is susceptible to various modifications which may be introduced thereto without departing from the spirit of the invention. In one example, body 12 may be modified to have arms (not shown) for extending to upper portions of circular saw 2, so that shroud 10 may be connected to saw 2 at points other than existing holes 9 formed in base 8 of saw 2. Still other apparatus may be provided for connecting saw 2 to shroud 10 by passing members through existing holes 9. Also, the number of stubs 32 or 34 available for connection to a source of vacuum may be reduced or increased, as desired.

Also, function of studs 36 may be provided in other ways. For example, threaded anchors or tapped holes (neither shown) may be located in body 12, with fasteners (not shown) such as screws and bolts having male threads inserted from above.

It is to be understood that the present invention is not limited to the embodiments described above, but encompasses any and all embodiments within the scope of the following claims.

I claim:

1. A shroud for a hand wielded, powered circular saw having a circular, rotatable blade, a blade guard, and a base, said shroud comprising a body fabricated from a transparent material, whereby a person cutting a workpiece with said shroud mounted to the circular saw can observe the workpiece while cutting the workpiece, said body having an upper panel and a lower panel disposed beneath said upper panel and defining a chamber between said upper panel and said lower panel, said upper panel having means for being sealingly joined to said lower panel, thereby sealing said chamber, said lower panel of said body having a bottom surface which is flat, planar, and horizontal when said shroud is mounted to the circular saw, whereby said circular saw can be slid on the workpiece while cutting in its conventional position relative to the workpiece when the shroud is mounted to the circular saw, said upper panel having a first slot and said lower panel having a second slot disposed in vertical registry with said first slot, said first slot and said second slot enabling passage of the blade and blade guard of the circular saw therethrough, and at least one short conduit for accepting a vacuum hose to be slipped thereover, said short conduit communicating with said chamber of said body, said shroud having means for mounting said shroud to the circular saw such that said body is horizontally oriented when the circular blade of the saw is vertically oriented; and an adapting member for reducing clearances between the circular blade of the circular saw and said upper panel of said body of said shroud and for reducing clearances between the blade guard of the circular saw and said lower panel of said body of said shroud, said adapting member being dimensioned and configured to abut flush against said upper panel of said body and having formed therein a third slot including a relatively narrow section for passing only the blade of the circular saw therethrough and a relatively wide section for passing the blade guard therethrough, said adapting member, said lower panel of said body and said upper panel of said body having means for accepting vertically oriented threaded fasteners to pass through holes formed in the base of the circular saw and to thread to said body of said shroud.

2. A shroud for a hand wielded, powered circular saw having a circular, rotatable blade, a blade guard, and a base, said shroud comprising a body having an upper panel and a lower panel disposed beneath said upper panel and defining a chamber between said upper panel and said lower panel, said upper panel having means for being sealingly joined to said lower panel, thereby sealing said chamber, said upper panel having a first slot and said lower panel having a second slot disposed in vertical registry with said first slot, said first slot and said second slot enabling passage of the blade and blade guard of the circular saw therethrough, and said shroud having means for mounting said shroud to the circular saw such that said body is horizontally oriented when the circular blade of the saw is vertically oriented.

3. The shroud according to claim 2, further comprising an adapting member for reducing clearances between the circular blade of the circular saw and said upper panel of said body of said shroud and for reducing clearances between the blade guard of the circular saw and said lower panel of said body of said shroud, said adapting member being dimensioned and configured to abut flush against said upper panel of said body and having formed therein a third slot including a relatively narrow section for passing only the blade of the circular saw therethrough and a relatively wide section for passing the blade guard therethrough.

4. The shroud according to claim 2, further including at least one short conduit for accepting a vacuum hose to be slipped thereover, said short conduit communicating with said chamber of said body.

5. The shroud according to claim 2, said lower panel of said body and said upper panel of said body having means for accepting vertically oriented threaded fasteners to pass through holes formed in the base of the circular saw and to thread to said body of said shroud.

6. The shroud according to claim 2, said body fabricated from a transparent material, whereby a person cutting a workpiece with said shroud mounted to the circular saw can observe the workpiece while cutting the workpiece.

7. The shroud according to claim 2, said lower panel of said body having a bottom surface which is flat, planar, and horizontal when said shroud is mounted to the circular saw, whereby said circular saw can be slid on the workpiece while cutting in its conventional position relative to the workpiece when the shroud is mounted to the circular saw.

* * * * *